(12) United States Patent
Zheng et al.

(10) Patent No.: US 12,524,400 B2
(45) Date of Patent: Jan. 13, 2026

(54) UNIFIED MULTILINGUAL COMMAND RECOMMENDATION MODEL

(71) Applicant: MICROSOFT TECHNOLOGY LICENSING, LLC, Redmond, WA (US)

(72) Inventors: Yating Zheng, Redwood City, CA (US); Shuo Li, Newton, MA (US); Yijia Xu, Chicago, IL (US); Sandip Nath, Redmond, WA (US); Duc Mai Thanh Le, Brookline, MA (US); Priyanka Subhash Kulkarni, Seattle, WA (US); Manan Sanghi, Bellevue, WA (US); Pamela Bhattacharya, Redmond, WA (US); Jignesh Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1128 days.

(21) Appl. No.: 17/235,517

(22) Filed: Apr. 20, 2021

(65) Prior Publication Data

US 2022/0335043 A1   Oct. 20, 2022

(51) Int. Cl.
*G06F 16/2452* (2019.01)
*G06F 16/2457* (2019.01)
(Continued)

(52) U.S. Cl.
CPC .... *G06F 16/2452* (2019.01); *G06F 16/24575* (2019.01); *G06F 16/284* (2019.01); *G06N 3/04* (2013.01); *G06N 3/08* (2013.01)

(58) Field of Classification Search
CPC .. G06F 16/2452–24528; G06F 16/3332–3338; G06F 9/453; G06F 16/284–288; G06F 16/24575; G06F 9/454; G06F 16/3337; G06N 3/02–105; G06N 3/04–0499; G06N 3/08–0985
See application file for complete search history.

(56) References Cited

U.S. PATENT DOCUMENTS 8,224,836 B1 *  7/2012  Piratla ................. G06F 16/3337
                                                  707/769
9,779,085 B2 * 10/2017  Wick ...................... G06F 40/44
(Continued)

FOREIGN PATENT DOCUMENTS

CN      109933724 B  *  1/2022

OTHER PUBLICATIONS

Chaiken, et al., "Scope: Easy and Efficient Parallel Processing of Massive Data Sets", In Proceedings of the Very Large Data Bases Endowment, vol. 1, Issue 2, Aug. 24, 2008, 12 Pages.
(Continued)

*Primary Examiner* — Liang Y Li
(74) *Attorney, Agent, or Firm* — Novo TechIP International PLLC

(57) ABSTRACT

A method and system for one or more application command recommendations may include receiving a search query, the search query being an in-application assistance query, accessing contextual data associated with the search query, providing at least one of the search query and the contextual data as input to a multilingual machine-learning (ML) model to identify one or more application command recommendations, obtaining the one or more application command recommendations as an output from the multilingual ML model, and providing data about the output to the application for display. The multilingual ML model uses a multilingual encoder to provide command recommendations for a plurality of languages.

12 Claims, 8 Drawing Sheets

(51) Int. Cl.
*G06F 16/28* (2019.01)
*G06N 3/04* (2023.01)
*G06N 3/08* (2023.01)

(56) References Cited

U.S. PATENT DOCUMENTS

| | | | |
|---|---|---|---|
| 11,269,665 B1* | 3/2022 | Podgorny | G06N 20/00 |
| 11,429,257 B1* | 8/2022 | Nandagopal | G06F 9/453 |
| 2012/0185496 A1* | 7/2012 | Magdy | G06F 40/44 |
| | | | 707/E17.062 |
| 2019/0325863 A1* | 10/2019 | Martin | G06F 7/14 |
| 2020/0184158 A1* | 6/2020 | Kuczmarski | G06N 20/00 |
| 2020/0372115 A1* | 11/2020 | Liu | G06F 40/58 |
| 2021/0064828 A1* | 3/2021 | Johnson Premkumar | |
| | | | G10L 15/063 |

OTHER PUBLICATIONS

Chen, et al., "A Lightweight Neural Model for Biomedical Entity Linking", In Repository of arXiv:2012.08844v1, Dec. 16, 2020, 9 Pages.

Devlin, et al., "BERT: Pre-training of Deep Bidirectional Transformers for Language Understanding", In Repository of arXiv:1810.04805v1, Oct. 11, 2018, 14 Pages.

Kondratyuk, et al., "75 Languages, 1 Model: Parsing Universal Dependencies Universally", In Repository of arXiv:1904.02099v3, Aug. 25, 2019, 17 Pages.

Kudugunta, et al., "Investigating Multilingual NMT Representations at Scale", In Repository of arXiv:1909.02197v2, Sep. 11, 2019, 20 Pages.

Pires, et al., "How multilingual is Multilingual BERT?", In Repository of arXiv:1906.01502v1, Jun. 4, 2019, 6 Pages.

Vunikili, et al., "Clinical NER using Spanish BERT Embeddings", In Proceedings of the Iberian Languages Evaluation Forum, 2020, pp. 505-511.

Wang, et al., "Cross-Lingual BERT Transformation for Zero-Shot Dependency Parsing", In Repository of arXiv:1909.06775v1, Sep. 15, 2019, 9 Pages.

Wu, et al., "Beto, bentz, becas: The surprising cross-lingual effectiveness of BERT", In Repository of arXiv:1904.09077v2, Oct. 3, 2019, 12 Pages.

\* cited by examiner

UNIFIED MULTILINGUAL COMMAND RECOMMENDATION MODEL

TECHNICAL FIELD

This disclosure relates generally to intelligent multilingual identification of commands in an application, and, more particularly, to a method of and system for utilizing a unified multilingual command recommendation model that intelligently identifies commanding intent of queries in multiple languages.

BACKGROUND

Many different content creation applications are used to create content. For example, users may utilize a content creation application to write an article, draft an email, create a spreadsheet, prepare a presentation and the like. Most content creation applications provide numerous commands for creating, editing, formatting, reviewing and/or consuming the content. Because of the sheer number of available commands, and because some of the available commands can be difficult to locate and access, some content creation applications provide an in-application search feature that enables users to search for commands. This may be done by submitting a search query for one or more keywords. While in-application searching can be very helpful in making command recommendations, the current models that are used to provide command recommendations do not always accurately identify a user's desired commands. This is particularly the case for applications offered in languages that are not considered a primary language of the application.

Furthermore, because of the large number of languages an application may be offered in, and since a different recommendation model is used for each different language, a significantly large number of recommendation models may need to be utilized to provide the in-application search feature in various languages. This can lead to significant processing and maintenance costs, as well as an unequal recommendation experience in the different languages.

Hence, there is a need for improved systems and methods of intelligently identifying and/or recommending commands in different languages.

SUMMARY

In one general aspect, the instant disclosure describes a data processing system having a processor and a memory in communication with the processor wherein the memory stores executable instructions that, when executed by the processor, cause the data processing system to perform multiple functions. The functions may include receiving a search query, the search query being an in-application assistance query, accessing contextual data associated with the search query, providing at least one of the search query and the contextual data as input to a multilingual machine-learning (ML) model to identify one or more application command recommendations, obtaining the one or more application command recommendations as an output from the multilingual ML model, and providing data about the output to the application for display, wherein the multilingual ML model uses a multilingual encoder to provide command recommendations for a plurality of languages.

In yet another general aspect, the instant disclosure describes a method for providing one or more application command recommendations. The method may include receiving a search query, the search query being an in-application assistance query, accessing contextual data associated with the search query, providing at least one of the search query and the contextual data as input to a multilingual ML model to identify one or more application command recommendations, obtaining the one or more application command recommendations as an output from the multilingual ML model, and providing data about the output to the application for display, wherein the multilingual ML model uses a multilingual encoder to provide command recommendations for a plurality of languages.

In a further general aspect, the instant disclosure describes a non-transitory computer readable medium on which are stored instructions that when executed cause a programmable device to receive a search query, the search query being an in-application assistance query, access contextual data associated with the search query, provide at least one of the search query and the contextual data as input to a multilingual ML model to identify one or more application command recommendations, obtain the one or more application command recommendations as an output from the multilingual ML model, and provide data about the output to the application for display, wherein the multilingual ML model uses a multilingual encoder to provide command recommendations for a plurality of languages.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
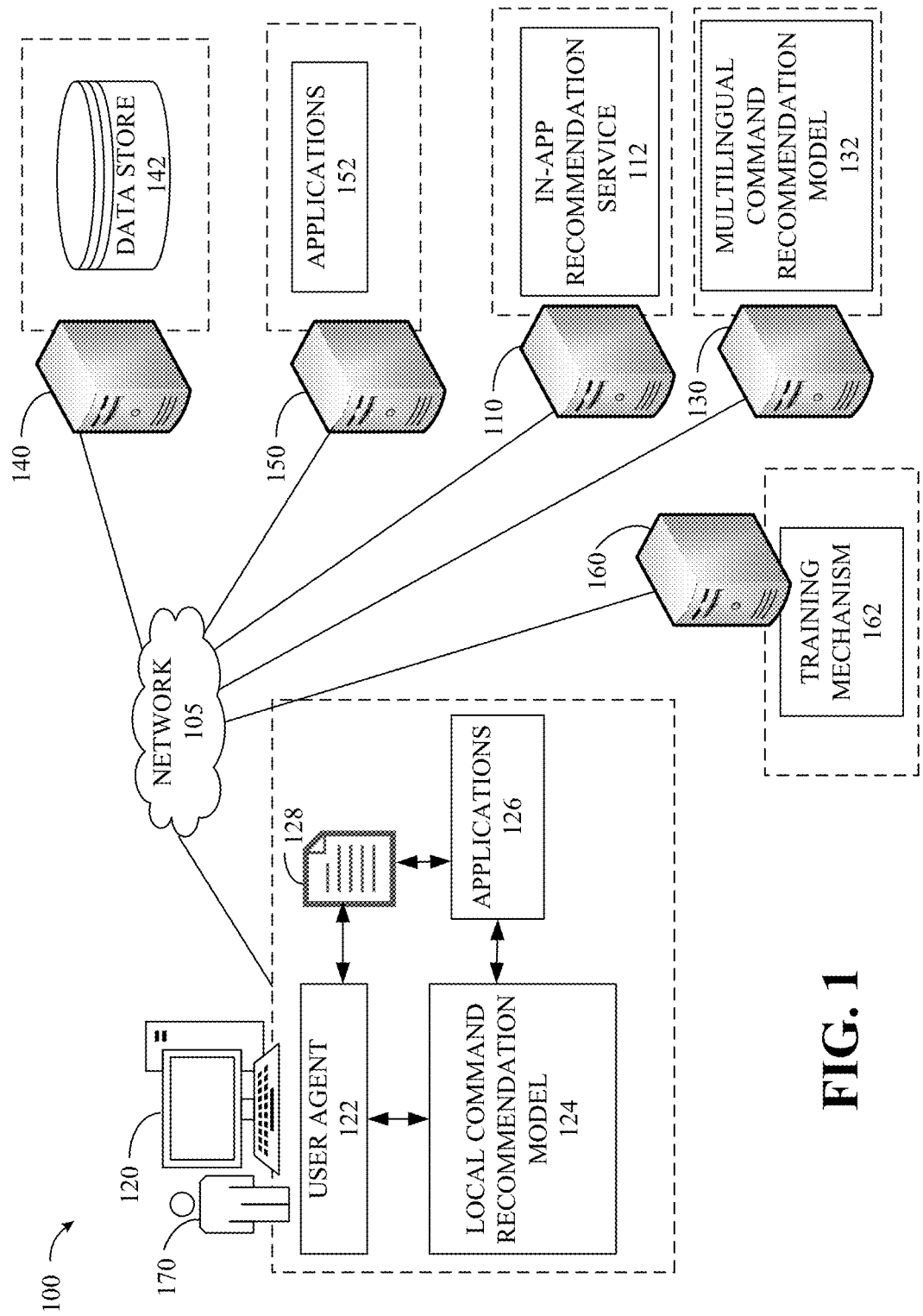
FIG. 1 depicts an example environment upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Users of computing devices often make use of complex content creation applications that offer many different types of commands for performing various tasks. Because of the large number of available commands, and to provide quick identification and access to a desired command, some content creation applications offer a feature of performing an in-application search. The in-application search may enable the user to submit a request for identifying one or more application commands, providing assistance and/or information that corresponds to the user's query. The in-application search feature may be provided by utilizing one or more machine-learning (ML) models.

Most content creation applications are offered in many different languages. Since the languages are different, the in-application command search feature may need a different ML for each different language. In an example, non-primary languages (e.g., languages other than English), utilize probabilistic ML models that do not take into account usage data. As a result, when different ML models are used for different languages, the accuracy of the predicted commands may be different for different languages. This may result in an unbalanced user experience across varying languages. Furthermore, the currently used ML models sometimes lack the desired degree of accuracy. Thus, there exists the technical problem of providing a similar in-application command search experience for users of different languages and increasing the accuracy of command recommendations.

Furthermore, when many different ML models are used for providing the in-application search feature, maintaining, providing ongoing training and/or updating all the different ML models may require significant computing, bandwidth and/or memory resources. Thus, there exists another technical problem of efficiently providing ongoing training and/or updating models that produce in-application searching.

To address these technical problems and more, in an example, this description provides a technical solution used for providing a multilingual command recommendation and/or digital assistant ML model that intelligently identifies commands and/or provides assistance in multiple languages. To do so, techniques may be used to apply a multilingual encoder and transformer-based deep learning model that maps different languages into the same embedding space. This may result in a unified model that provides in-application command recommendations in different languages. In some implementations, a query processing architecture using the unified model makes use of an in-application recommendation service for processing user queries in different languages, transmitting to the appropriate unified model, receiving recommendations from one or more unified models, and aggregating the recommendations before transmitting them to a client device for display to the user. The architecture may also collect data for ongoing training and improvement of the unified model. By utilizing a unified model that provides recommendations in different languages, both accuracy and efficiency are increased. Furthermore, the architecture may take into various factors such as accuracy, reliability, and response time in choosing between a light-weight client-based model and a more complex cloud-based model. This increases efficiency and provides flexibility and increased reliability and as such an improved overall user experience. In some implementations, a confidence score is used to categorize recommendations into different categories in the user interface (UI) to better identify recommendations that are more likely to be related to the user's search query. This can reduce cognitive load and provide an improved user experience in quickly and efficiently identifying and accessing a desired command. As a result, the technical solution provides an improved method of and system for intelligently identifying and displaying command recommendations in different languages.

As will be understood by persons of skill in the art upon reading this disclosure, benefits and advantages provided by such implementations can include, but are not limited to, a technical solution to the technical problems of inaccurate, inefficient and/or unbalanced in-application command recommendations in different languages. Solutions and implementations provided herein optimize the process of processing user queries in different languages and intelligently identifying and display command recommendations in response to the user queries. The benefits provided by these technology-based solutions yield more user-friendly applications, improved accuracy in command recommendations, more balanced accuracy across different languages and increased system and user efficiency.

As used herein, the term "command" may refer to a feature, an option or a functionality offered by an application to perform a given task. Furthermore, as used herein, the term "recommendation" may refer to a suggestion that is presented to a user for achieving a desired outcome or intent. The term "query" may be used to refer to one or more terms (e.g., user input including text, characters, emoticons, audio input, and the like) submitted in association with a search request and may include a zero-term search query. Zero-term search may refer to instances where the user does not provide search terms for a query, but the search is conducted based on contextual document data and/or user-specific data.

FIG. 1 shows an example environment 100, upon which aspects of this disclosure may be implemented. The environment 100 may include a server 110 which may include and/or execute an in-app recommendation service 112, a server 130, which may include and/or execute a multilingual command recommendation model 132, and a server 150 which may include and/or one or more online applications 152. Each of the servers 110, 130 and 150 may operate as a shared resource server located at an enterprise accessible by various computer client devices such as client device 120. Each of the servers may also operate as a cloud-based server for offering in-app search services, multilingual command recommendations and/or online applications. Although shown as one server, each of the servers 110, 130 and 150 may represent multiple servers for performing various different operations. For example, the server 130 may include one or more processing servers for performing the operations of various different multilingual command recommendation models.

The in-app recommendation service 112 may operate as a hub for connecting various client devices to endpoint in-application command recommendation services. To achieve this, the in-app recommendation service 112 may receive one or more search queries from a client device such as client device 120, identify an appropriate ML model to transmit the search query to, and transmit a request for processing the search query to one or more appropriate ML models. This may involve using logic to determine what type of application and/or platform the search query was received from and then identifying an ML model that corresponds to the identified application and/or platform. In some implementations, this involves the use of a multiplexer and/or classifier. In some implementations, the in-app recommendation service 112 provides display data to the applications 112/126 for displaying the identified command recommendations in a manner that is easy to navigate and/or conserves UI screen space. For example, the recommended commands may be categorized into different categories (e.g., best action, actions, etc.), with each category having a different label to make the recommendations easier to view and select.

Once the request is processed by the appropriate ML models, the in-app recommendation service 112 may receive one or more recommendations from the ML models. For example, the in-app recommendation service 112 may receive a plurality of recommendations from the multilingual command recommendation model 132 and a plurality of recommendations from a web search engine (not shown). The received recommendations may be aggregated by the in-app recommendation service 112 into one package that can be transmitted to the requesting client device.

The multilingual command recommendation model 132 may provide intelligent multilingual command recommendations in response to search queries submitted from within an application. To achieve this, the multilingual command recommendation model 132 may examine contextual data (e.g., data related to the document, application and/or user), examine usage history data, and/or a plurality of other factors to identify one or more commands that are likely to be associated with the search query based on the examined data. The identified one or more commands may be in a specific language. The language may be the same as the preferred language of the application from which the search query was received. For example, if the preferred language of the application from which the search query was received is Spanish, even if the search query itself is in English, the recommendations may be provided in Spanish. This may be achieved by using a unified multilingual command recommendation model 132 that provides recommendations in multiple languages. The internal structure of the multilingual command recommendation model 132 is discussed below with regards to FIG. 2A.

The environment 100 may also include a server 160 which may include and/or execute a training mechanism for training the multilingual command recommendation model 132. The training mechanism 162 may use training data sets stored in the data store 142 to provide initial and ongoing training for each of the models in the multilingual command recommendation model 132, as further discussed below with regards to FIG. 2B. Alternatively, and/or additionally, the training mechanism 162 may use training data sets unrelated to the data store. This may include training data such as knowledge from public repositories (e.g., internet), knowledge from other enterprise sources, or knowledge from other pretrained mechanisms (e.g., pretrained models). In one implementation, the training mechanism 162 may use labeled training data from the data store 142 to train one or more of the ML models via deep neural network(s) or other types of ML algorithms. Alternatively, and/or additionally, the training mechanism 162 may use unlabeled training data. The initial training may be performed in an offline stage or may be performed online. Additionally, and/or alternatively, the one or more ML models may be trained using batch learning. It should be noted that in collecting and storing training data and training the ML models, care is taken to ensure that user privacy is protected, and the training is performed such that it complies with ethical and legal guidelines.

As a general matter, the methods and systems described herein may include, or otherwise make use of, a machine-trained model or a probabilistic model to predict a user's desired command for a document and/or application. ML generally involves various algorithms that a computer can automatically learn over time. The foundation of these algorithms is often built on mathematics and statistics that can be employed to predict events, classify entities, diagnose problems, and model function approximations. As an example, a system can be trained using data generated by a ML model in order to identify patterns in user activity and/or determine associations between various actions and application commands. Such determination may be made following the accumulation, review, and/or analysis of data from a large number of users over time. This data may be configured to provide the ML algorithm (MLA) with an initial or ongoing training set. In addition, in some implementations, a client device can be configured to transmit data captured locally during use of relevant application(s) to the cloud or the local ML program and provide supplemental training data that can serve to fine-tune or increase the effectiveness of the MLA. The supplemental data can also be used to facilitate identification of relevant commands and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of these ML models may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model is produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of the trained ML models.

It should be noted that the ML model(s) discussed herein may be hosted locally on the client device 120 or remotely, e.g., in the cloud. In one implementation, some ML models are hosted locally, while others are stored remotely. This may enable the client device 120 to provide some command recommendation when the client device 120 is not connected to a network or when a cloud-based model is taking too long to respond.

The servers 110, 130, 150, and 160 may each be connected to or include a storage server 140 containing the data store 142. The data store 142 may function as a repository in which documents, contextual information, data sets (e.g., training data sets) and/or pretrained ML models may be stored. The client device 120 may be connected to the server 110, 140 or 150 via a network 105. The network 105 may be a wired or wireless network(s) or a combination of wired and wireless networks that connect one or more elements of the system 100.

The client device 120 may be a personal or handheld computing device having or being connected to input/output elements that enable a user 170 to interact with digital content such as content of an electronic document 128 on the client device 120. Examples of suitable client devices 120 include, but are not limited to personal computers, desktop computers, laptop computers, mobile telephones, smart phones, tablets, phablets, smart watches, wearable computers, gaming devices/computers, televisions, head-mounted display devices and the like. The internal hardware structure of a client device is discussed in greater detail in regard to FIGS. 6 and 7.

The client device 120 may include one or more applications 126. Each application 126 may be a computer program executed on the client device that configures the device to be responsive to user input to allow the user 170 to interactively view, generate and/or edit digital content such as content within the electronic document 128. The electronic document 128 can include any type of data, such as text (e.g., alphabets, numbers, symbols), emoticons, still images, video and audio. The electronic document 128 and the term "document" used herein can be representative of any file that can be created via an application executing on a computer device. Examples of documents include, but are not limited to, word-processing documents, presentations, spreadsheets, notebooks, email messages, and the like. The electronic document 128 may be stored locally on the client device 120, stored in the data store 142 or stored in a different data store and/or server.

The application 126 may process the electronic document 128, in response to user input through an input device, to create and/or modify the content of the electronic document 128, by displaying or otherwise presenting display data, such as a GUI which includes the content of the electronic document 128, to the user 170. Examples of suitable applications include, but are not limited to, a word processing application, a presentation application, a note taking application, a text editing application, an email application, a spreadsheet application, an instant messaging application, a communications application, and a collaboration application.

The client device 120 may also access applications 152 that are run on the server 150 and provided via an online service to allow the user 170 to interactively view, generate and/or edit digital content online. Examples of suitable applications include, but are not limited to, a word processing application, a presentation application, a note taking application, a text editing application, an email application, a spreadsheet application, an instant messaging application, a communications application, a digital drawing application, and a collaboration application.

In some implementations, applications 152 communicate via the network 105 with a user agent 122, such as a browser, executing on the client device 120. The user agent 122 may provide a UI that allows the user 170 to interact with application content and electronic documents stored in the data store 142 and/or on the client device 120. The UI may be displayed on a display device of the client device 120. In some examples, the user agent 122 may be a dedicated client application that provides a UI and access to electronic documents stored in the data store 142 and/or on the client device 120.

In some implementations, the client device 120 may also include a local command recommendation model 124 for providing local command recommendation services. In an example, the local command recommendation model 124 may operate with the applications 126 to provide local command recommendation services. For example, when the client device 120 is offline, the local command recommendation model 124 may function as lightweight ML model to provide some command recommendations for display to the user 170. In some implementations, the local command recommendation model 124 makes use of local repositories to perform offline operations. In one implementation, enterprise-based repositories that are cached locally may also be used to provide local command recommendation services. It should be noted that each of the in-app recommendation service 112, multilingual command recommendation model 132 and local command recommendation model 124 may be implemented as software, hardware, or combinations thereof.

Figure 2A:
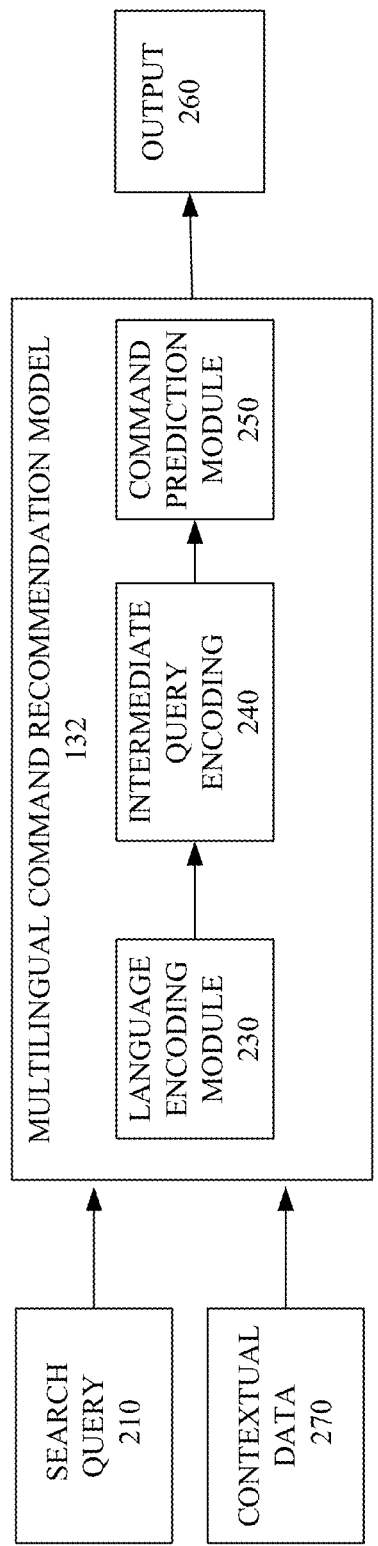
FIG. 2A-2B are example block diagrams representing a multilingual command recommendation model and the process for training the multilingual command recommendation model.

FIG. 2A depicts one implementation of a multilingual command recommendation model 132. As discussed above, a search query such as the search query 210 may be transmitted to the multilingual command recommendation model 132 for processing. The search query 210 may include one or more search terms provided by the user for requesting more information and/or recommendation for an application command. Alternatively, the search query 210 may be a zero-term search query. For example, simply selecting a UI menu option (e.g., clicking in the search box) may cause a request for a command recommendation to be submitted.

In addition to the search query 210, contextual data 270 may also be transmitted to the multilingual command recommendation model 132 for identifying command recommendations. The contextual data 270 may include data about the document and/or application from which the search query was received as well as user data and/or usage history data (e.g., data about the user's interactions with the document). For example, the contextual document data may include the subject matter of the document (which may be or may have been inferred separately and/or in the past by one or more ML models), the type of document (e.g., scientific article, poetry, patent application, etc.), the person(s) to whom it is directed (e.g., the "to" line of an email message), the overall tone of the document (e.g., formal, causal, and the like), and one or more content segments of the document, among others. The user data within the contextual data 270 may include information about the user creating the content, the type(s) of actions performed by the user within the document (e.g., within a specific time period and/or since document creation), the position of the user within an organization (e.g., the user's job title or department to which the user belongs), the types of documents the user generally creates, edits, reviews and/or views, the user's use-history (e.g., the recommendations the user has selected in the past in response to search queries, the user's writing style, vocabulary level, proficiency in use of the application, most often-used features within the application), user profile data (e.g., various profiles within which the user creates content such as work profile, blogger profile, social media profile and the like) and the like. The contextual data 270 may be transmitted directly from the document, may be transmitted from other services that provide the specific type of information (e.g., a tone detection service for providing the overall tone of the document) and/or may be retrieved from a data store (e.g., data store 142).

The multilingual command recommendation model 132 may be a trained ML model that is trained to identify one or more commands that correspond to the search query 210. In some implementations, the multilingual command recommendation model 132 includes a language encoding module 230 and a command prediction module 250. The language encoding module 230 may be a multilingual encoder transformer such as the multilingual Bidirectional Encoder Representations from Transformers (mBERT). Alternatively, other multilingual natural language processing (NLP) models may be used. The mBERT model may be a pretrained model that includes vocabulary embeddings from multiple languages (e.g., 104 different languages). The language encoding module 230 may receive and convert the search query 210 into intermediate query encoding 240 which may consist of one or more embeddings.

The intermediate query encoding 240 (e.g., embeddings) may be fed to the command prediction module 250. In some implementations, the command prediction module 250 is a multi-layer (e.g., dense layer) neural network that predicts the probability of each command being selected by the user (e.g., clicking probability) by taking a plurality of parameters into account. In an example, the command prediction module 250 is a two-layer fully connected neural network. Once the probability of selection is calculated for multiple commands, those commands having a probability that is higher than a predetermined threshold may be selected as the recommended commands. In some implementations, the probability calculations may be used to rank the recommended commands. For example, commands having higher probabilities may be ranked higher. The selected commands along with their probability scores and/or their rankings may be provided as the output 260. Thus, the multilingual command recommendation model 132 may receive a search query 210 as an input and may provide one or more recommendations in a desired language as an output.

It should be noted that different applications and platforms offer different commands. As such, a separate multilingual command recommendation model 132 may be used for each application and/or platform. For example, there may be a multilingual command recommendation model 132 for a word processing application and a separate multilingual command recommendation model 132 for a presentation application. In some implementations, however, a single unified multilingual command recommendation model 132 is used for multiple applications and/or platforms. In such an implementation, a single model is trained for providing recommendations for various applications. This may involve supplying the application type, type of platform, and/or other metadata as a parameter to the model which will be taken into account in providing the recommended commands.

Figure 2B:
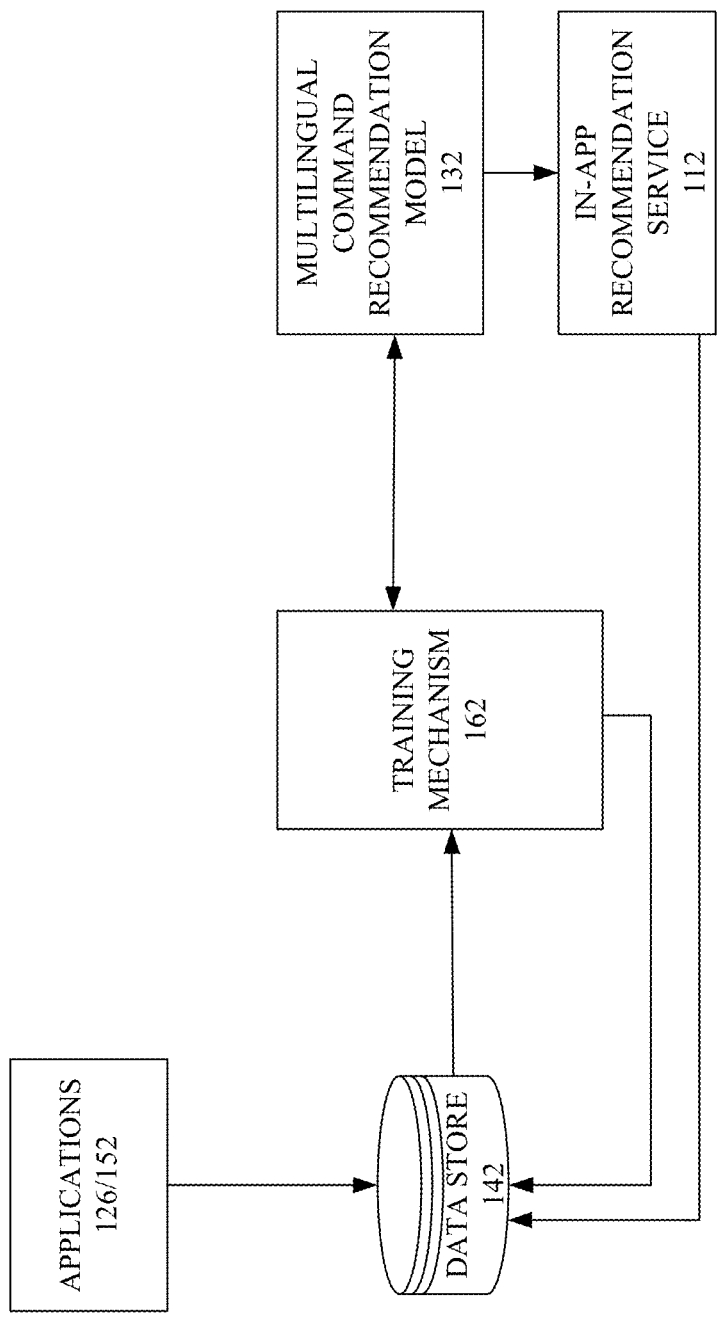

FIG. 2B depicts how a multilingual command recommendation model may be trained by using a training mechanism. The training mechanism 162 may use training data sets stored in the data store 142 to provide initial and ongoing training for each of the models included in the multilingual command recommendation model 132. The multilingual command recommendation model 132 may be trained by using labeled training data along with pretrained models.

The training data may include usage data collected over a period of time. For example, the data may include user search queries collected from a number of users. The data may include information such as the user's entered query, user's system local and language settings (e.g., UI language), recommended commands shown to the user and the user's selection. The collected data may be anonymized such that all user identification and/or confidential information is removed. Thus, in collecting and storing training data and training the ML models care is taken to ensure users privacy is protected. In an example, to ensure privacy is protected, only search queries that correspond to public web search queries are collected and used for training. For example, search queries may be examined and only those queries that correspond to queries received on search engine (e.g., Bing) from a predetermined number of users (e.g., 40 or more users) may be collected.

To ensure compliance with ethical and privacy guidelines and regulations, in one implementation, an optional UI element may be provided to inform the user of the types of data collected, the purposes for which the data may be used and/or to allow the user to prevent the collection and storage of user related data. The UI may be accessible as part of features provided for customizing an application via a GUI displayed by the application when the user selects an options menu button. Alternatively, the information may be presented in a user agreement presented to the user when they first install the application.

In some implementations, when the collected data is categorized by UI languages, a number of top languages are identified and analyzed. In an example, the top languages were identified as English, Spanish, German, Chinese, French, Portuguese, Italian, Dutch, Japanese, Russian. In some implementations, the top languages may be used for modeling and evaluation of the multilingual command recommendation model. Previous mechanisms used for providing command recommendations in different languages lead to an unbalanced rate of selection. As an example, the command click-through-rate (CTR), which may be defined as the probability of a command being clicked by the user given that user type in a search query varied significantly for different languages. For example, English was shown to have a CTR of 72%, while Japanese was shown as having a CTR of 48%. This is because previous mechanism used different client-based models for different languages. For example, some mechanisms used Naïve Bayes and/or transformer-based NLP models for English, while using term frequency inverse document frequency (TFIDF) models for other languages. Furthermore, the number of terms in the search query varies for different languages. As a result, languages that tend to include more terms in the search query (e.g., Japanese) may provide results having a different rate of accuracy than those having fewer terms (e.g., English).

The unified multilingual command recommendation model 132 disclosed herein overcomes these shortcomings by utilizing a pretrained multilingual model and making use of a training data set that includes labeled data from a variety of languages. The labeled training data may be used in a supervised learning process to train the unified multilingual command recommendation model 132. Once it is trained, the unified multilingual command recommendation model 132, the encoder used in the model may be fine-tuned such that the embeddings encoder better represents the desired context.

To provide ongoing training, the training mechanism 162 may also use training data received from the trained multilingual command recommendation model 132. Furthermore, data may be provided from the training mechanism 162 and the in-app recommendation service 112 to the data store 142 to update one or more of the training data sets in order to provide updated and ongoing training. Moreover, ongoing training data may be provided by the applications 126/152. Additionally, the training mechanism 162 may receive training data such as knowledge from public repositories (e.g., Internet), knowledge from other enterprise sources, or knowledge from other pre-trained mechanisms.

Figure 3:
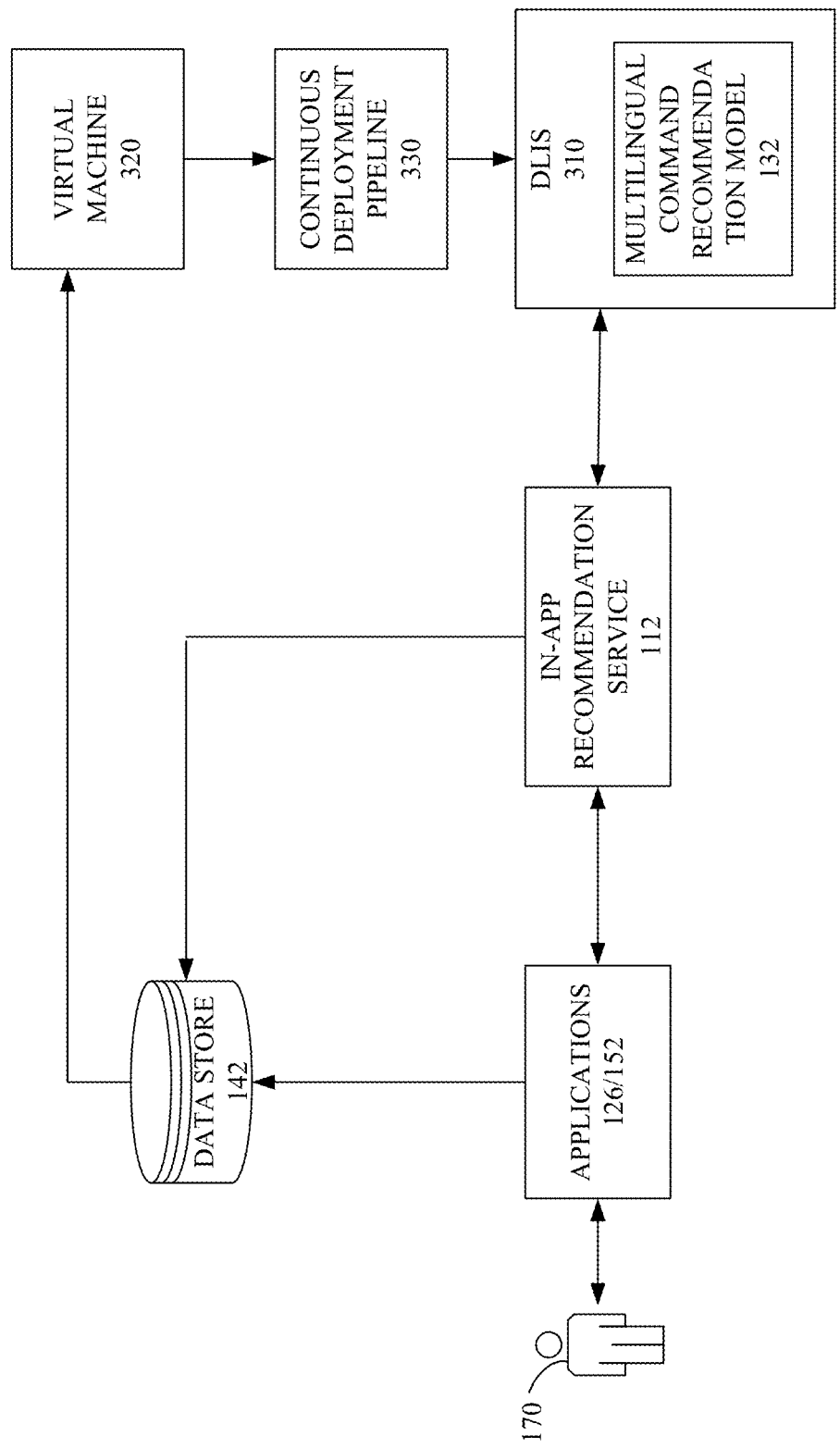
FIG. 3 is an example systems level data flow between some elements of a unified multilingual command recommendation system.

FIG. 3 depicts a system level data flow between some of the elements of a system providing multilingual command recommendations. User search queries may be received from the user 170 via the applications 126/152 and transmitted to the in-app recommendation service 112. The in-app recommendation service 112 may examine the search query along with other identifying information (e.g., the type of application and/or platform, the UI language, etc.) to identify the one or models to submit the search query to. The models may include the trained multilingual command recommendation model 132 and/or other models (not show) for providing other types of search results and/or recommendations. In an example, in addition to providing command recommendations, web searching, enterprise document searching, people in organization searching and the like may be performed in response to a search query. Once, the appropriate models are identified, the in-app recommendation service 112 may call a hosting platform such as a deep learning inference system (DLIS) endpoint 310 to request command recommendations for the received search query.

In some implementations, the in-app recommendation service 112 is designed as a type-ahead. As a result, when some recommendation services are slower than others (e.g., web search engines are slower than the multilingual command recommendation model 132), the response to the search query may be divided into a portion dedicated to the multilingual command recommendations and another for other types of recommendations. The results may be transmitted from the in-app recommendation service 112 to the applications 126/152 in these two separate portions. On the client device, the recommendation results may be updated dynamically, with the command recommendations being displayed first. Alternatively, to avoid a visible screen change (e.g., a flicker), displaying the command recommendations results may be delayed for a predetermined time period to provide additional time for the remaining recommendations to be received and displayed at the same time.

The DLIS 310 may host and execute the one or more multilingual command recommendation model 132. Furthermore, the DLIS 310 may provide a secure Hypertext Transfer Protocol (HTTP) representation state transfer (REST) endpoint for the multilingual command recommendation model 132. The DLIS 310 may provide a secure and privacy compliant deployment environment for deploying the multilingual command recommendation model 132.

To ensure the DLIS 310 is privacy and security compliant, before providing the multilingual command recommendation model 132 to the DLIS 310 for deployment, the multilingual command recommendation model 132 may first be packaged as a serialized model artifact and then the serialized model artifact and its associated libraries may be packaged into a Python package. A virtual environment for the Python package may then be generated and distributed to the DLIS 310 via a continuous deployment pipeline 330 which operates with a virtual machine 320 to deploy the multilingual command recommendation model 132.

The virtual machine 320 may function as a hub for data processing, testing, and/or model training and as such may include a training mechanism for training the multilingual command recommendation model 132. In some implementations, multiple virtual machines 320 may be used. In an example implementation, the model deployment configuration includes 5 different regions of deployment across the globe, with 4 instances of virtual machines per region (e.g., 4 instances of 4-core CPU, 4GM memory virtual machines).

The trained multilingual command recommendation model 132 may perform the required search and provide one or more recommendations back to the in-app recommendation service 112. In some implementations, the trained multilingual command recommendation model 132 may also provide rankings and/or confidence scores for each of the provided recommendations to enable the in-app recommendation service 112 to categorize and/or rank the recommendations. In response, the in-app recommendation service 112 may aggregate all of the received recommendations (e.g., command, web results, people results, etc.) and create a list of recommendations for presenting to the user 170. The list of recommendations may be transferred back to the applications 126/152 to displayed in the UI screen of the applications 126/152.

Search query, recommended commands, and user selection data may be transmitted from the applications 112/152 and/or the in-app recommendation service 112 to the data store 142 for collection and storage. This may be anonymized, as discussed above, and stored for use in training the multilingual command recommendation model 132.

Figure 4:
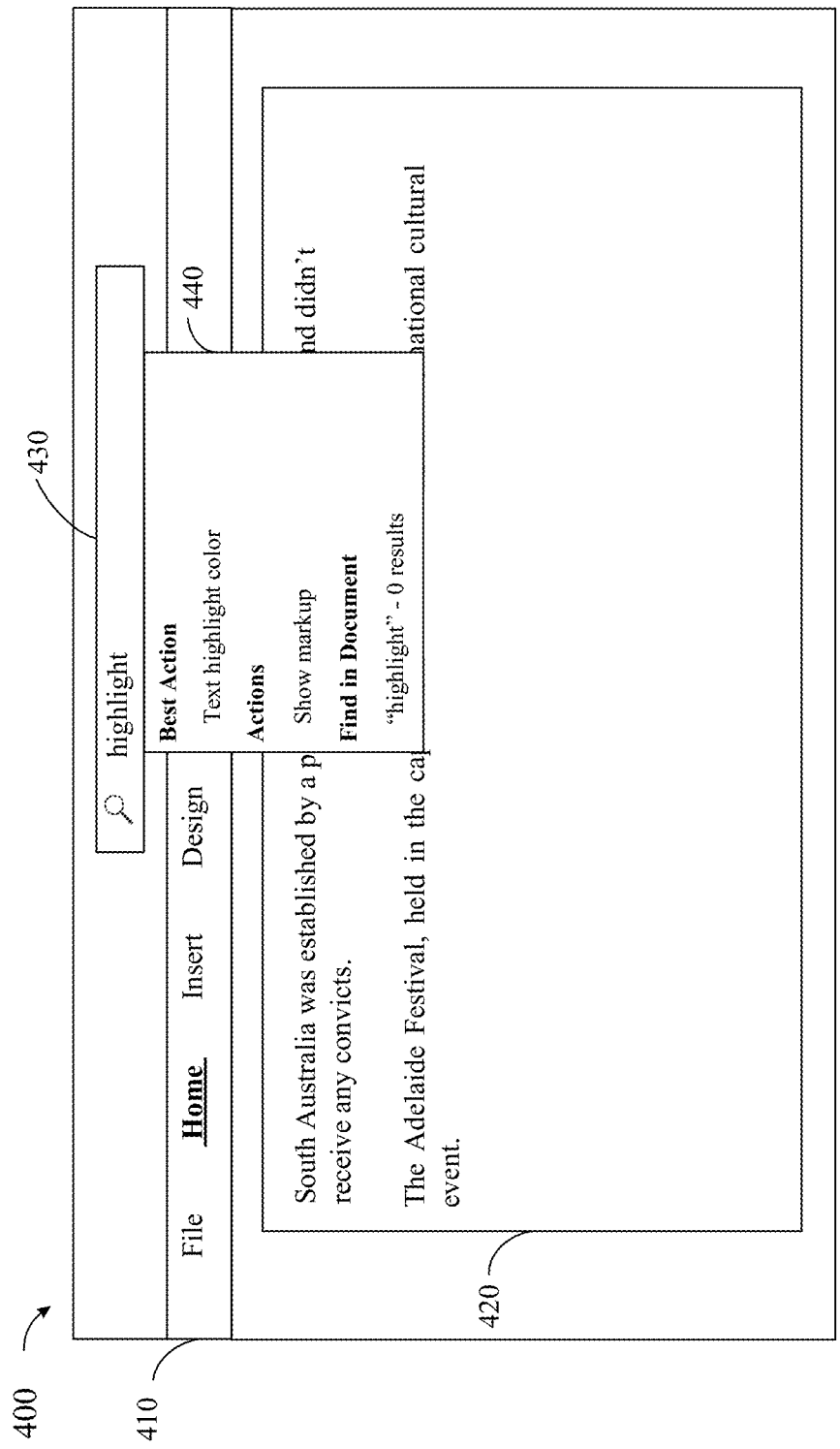
FIG. 4 is an example graphical user interface (GUI) screen for providing multilingual command recommendations.

FIG. 4 is an example GUI screens for displaying recommended commands in response to an in-application search query. FIG. 4 is an example GUI screen 400 of a word processing application (e.g., Microsoft Word®) displaying an example document. GUI screen 400 may include a toolbar menu 410 containing various tabs each of which may display top-level commands and provide access to lower-level commands for performing various tasks. Screen 400 may also contain a content pane 420 for displaying the content of the document. The content may be displayed to the user for viewing and/or editing purposes and may be created by the user. For example, the user may utilize an input device (e.g., a keyboard) to insert input such as text into the content pane 420.

In addition to the toolbar 410, the screen 400 may include an in-application search UI menu option 430 to enable the user to enter a search query. To do so, the user may be able to click on the UI menu option 430 and enter one or more desired search terms. In some implementations, as the search terms are entered, they are transmitted to the in-app recommendation search service for processing. In this manner, the user is able to search for and gain access to information about various commands offered by the application from within the GUI screen 400. This may save time, as the user does not need to look at different menu options to locate a desired command.

In some implementations, once the menu option 430 is selected (e.g., the user clicks in the box) and begins entering a search query, a recommendations UI element 440 is displayed alongside the UI menu option 430 to display recommended commands and/or search results. The displayed recommendations may be provided in the UI language of the screen 400. Because the mechanism provided herein make use of a multilingual command recommendation model, command recommendations may be provided in the UI language even if the search query is in a different language. For example, a Spanish term may be input into the UI menu option 430 for searching, and the recommended commands may be displayed in English, when the UI language of the screen (e.g., preferred language of the application or operating system) is English. This enables users to utilize multiple languages to conduct an in-application search and receive the same or similar results in the UI language.

In some implementations, to ensure the recommendations UI element 440 is populated as fast as possible, a local command recommendation model is utilized alongside the in-app recommendation service. The local command recommendation model may be a lightweight model that provides instantaneous results. As such, the recommendations UI element 440 may first be populated with results from the local command recommendation model until results from the in-app recommendation service (e.g., cloud service) are received. Once the results from the in-app recommendation service, they may be compared to the results displayed in the recommendations UI element 440. When the results are different, the recommendations UI element 440 may be updated with the results received from the in-app recommendation service. This may result in a visual jitter on the screen 400. To avoid the visual jitter, in some implementations, the local results are not shown unless the in-app recommendation service is timed out.

The results displayed in the recommendation UI element 440 may be categorized into different categories to enable quick identification and differentiation between the different categories. For example, command recommendations may be displayed on top, and other search results such as results found in the document, web search results, and the like are displayed below the command recommendations. The command recommendations may also be categorized into a highly likely category labeled as "best action" and another category labeled as "actions." Best action may identify commands that are highly likely to correspond with the user's desired intent. This may be determined based on a confidence score provided by the multilingual command recommendation model. The remaining commands may also be displayed based on their ranking which may be determined based on a probability or confidence score. This reduces cognitive load and may enable the user to quickly and efficiently identify a desired command.

Figure 5:
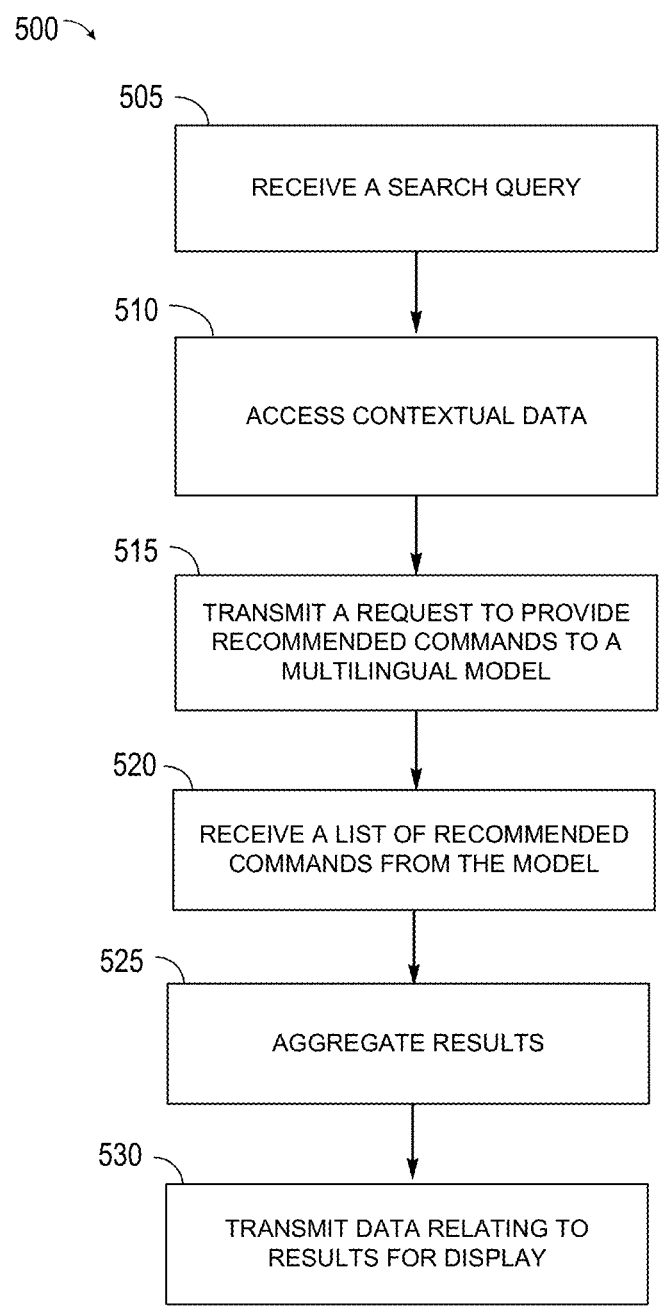
FIG. 5 is a flow diagram depicting an example method for providing intelligent multilingual command recommendations.

FIG. 5 is a flow diagram depicting an exemplary method 500 for providing intelligent multilingual command recommendation. In an example, one or more steps of method 500 may be performed by an in-app recommendation service (e.g., in-app recommendation service 112 of FIG. 1), local command recommendation model (e.g., local command recommendation model 124 of FIG. 1), and/or a multilingual command recommendation model (e.g., multilingual command recommendation model 132). Other steps of method 500 may be performed by a content creation application (e.g., applications 112 or applications 126 of FIG. 1).

At 505, method 500 may begin by receiving a search query. As discussed above, the search query may be received via a UI screen and may include one or more terms or may be a zero-term search query. The search query may be referred to as an assistance query, as the query may relate to a search for assistance in accomplishing the user's intent. This may include searching for one or more application commands, information, people, and the like. Upon receiving the search query, method 500 may proceed to access contextual data, at 510. The contextual data may include contextual document data, user-specific data, data relating to the action(s) taken by the user in the document, enterprise-specific data, and/or any other data that may provide helpful information in inferring the user's desired intent with respect to the document. In some implementations, at least some of the contextual data may be transmitted with the search query. The contextual data may be stored and/or provided in a storage medium and provided to the in-app recommendation service and/or multilingual command recommendation model, as requested and/or needed.

In some implementations, accessing contextual data involves utilizing one or more text analytics algorithms that may examine the content, context, formatting and/or other parameters of the document to identify a style associated with the document, keywords associated with the document (e.g., the title of the document), the type of content, the type of application, and the like. It should be noted that in collecting and analyzing document data is taken to ensure users privacy is protected.

Once the contextual data has been accessed, method 500 may transmit a request to provide recommend commands to a multilingual command recommendation model, at 515. This may be achieved by utilizing one or more unified multilingual ML models that receive the search query and the contextual data as an input and provide one or more recommended commands as an output.

Once the request for providing one or more recommended command is transmitted, method 500 may proceed to receive a list of the one or more recommended commands from the multilingual command recommendation model, at 520. Once one or more recommendations are received, method 500 may proceed to aggregate the recommendations and/or any other related search results into a search result list, at 525. The list may include a ranking and/or categories for each of the recommended commands and/or additional results. Data related to the aggregated results may then be transmitted for display, at 530. This may involve transmitting the results list to the application from which the request was received and providing a UI element that displays the results within a UI screen of the application.

In this manner, a mechanism is provided that makes use of a multilingual ML model for understanding user intent and providing command recommendations and/or user assistance and information for an application that has the capability for accepting user commands in multiple languages. The resulting application provides improved productivity, improved command recommendation accuracy and improved system efficiency. It should be noted that although the examples provided in this disclosure refer to command recommendations, the solutions discussed herein may be applied to responding to different types of user queries for assistance. These may include multilingual queries to digital assistants, chat bots, and the like.

Figure 6:
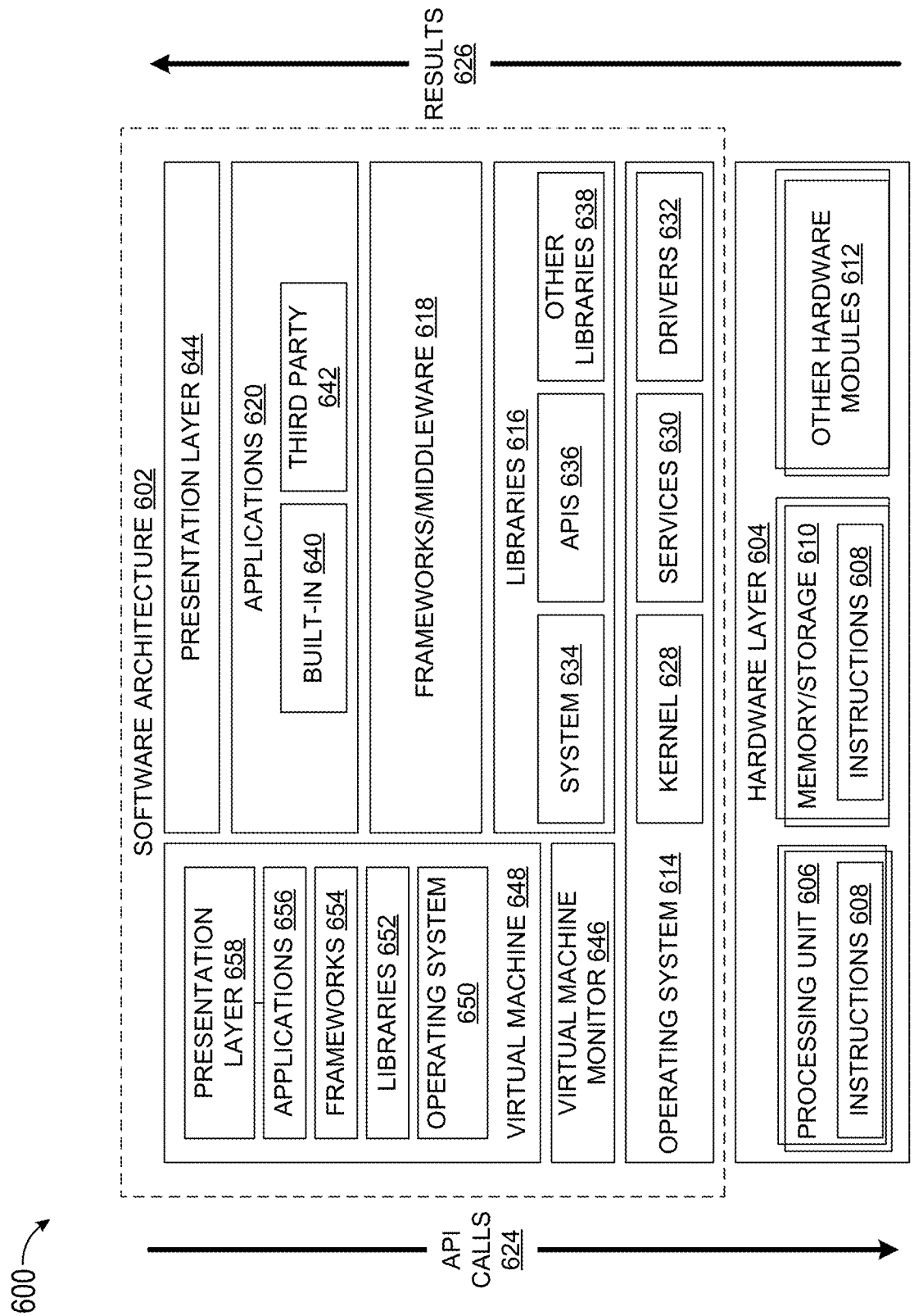
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware. The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
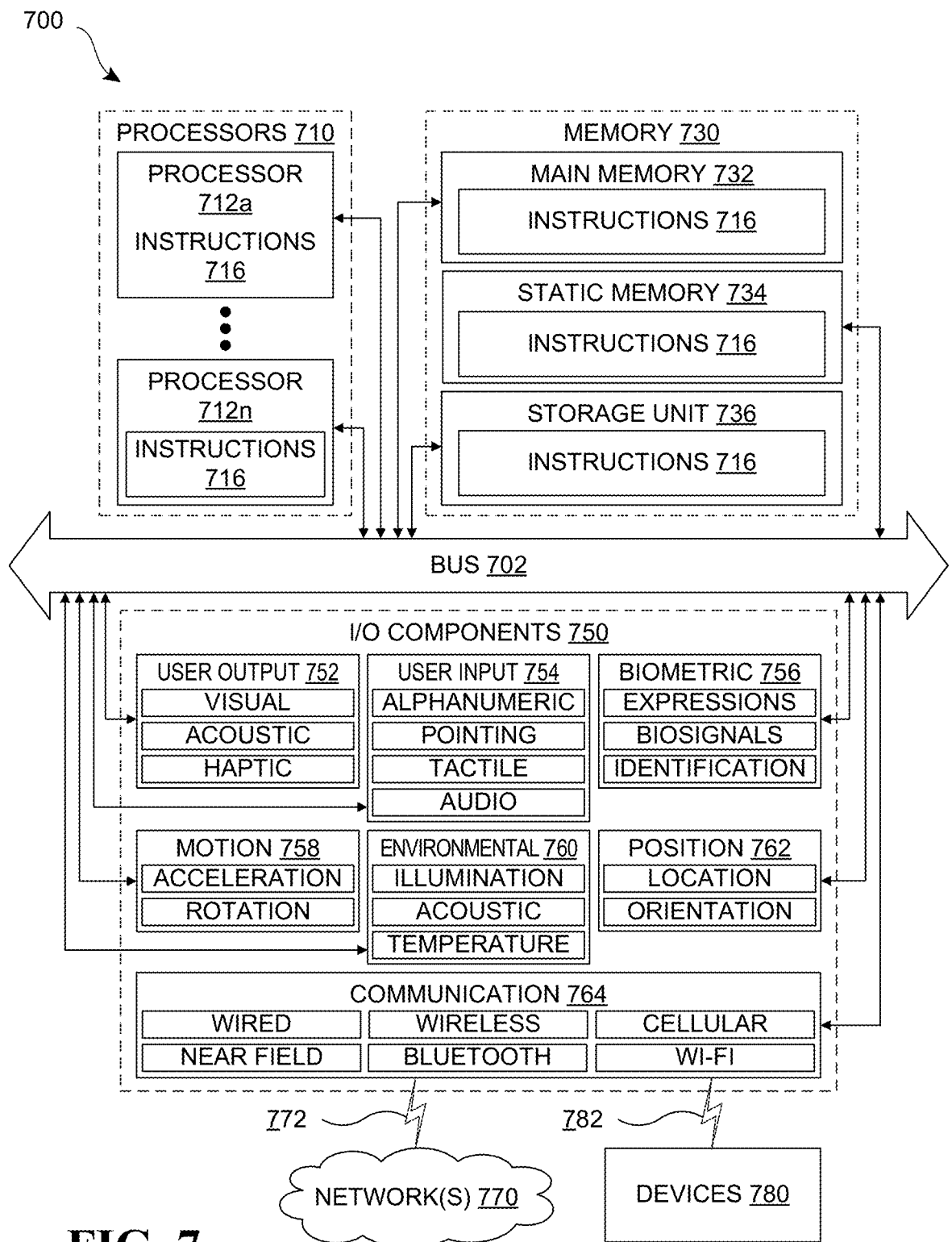
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712*a* to 712*n* that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving a search query, the search query being an in-application assistance query;
accessing contextual data associated with the search query;
providing at least one of the search query and the contextual data as input to a multilingual machine-learning (ML) model to identify one or more application command recommendations;
obtaining the one or more application command recommendations as an output from the multilingual ML model; and
providing data about the output to the application for display,
wherein the multilingual ML model uses a multilingual encoder to provide command recommendations for a plurality of languages.

Item 2. The data processing system of item 1, wherein the multilingual encoder maps the plurality of languages into one embedding space.

Item 3. The data processing system of items 1 or 2, wherein:
the ML model includes a command prediction module,
the multilingual encoder convers the search query into an embedding,
the embedding is provided to the command prediction module as an input, and
the output is provided by the command prediction module.

Item 4. The data processing system of item 3, wherein the command prediction module is a multi-layer neural network.

Item 5. The data processing system of any preceding item, wherein the multilingual ML model is deployed via a hosting service.

Item 6. The data processing system of any preceding item, wherein the instructions further cause the processor to cause the data processing system to perform functions of:
upon receiving the search query, providing at least one of the search query and the contextual data to a local command recommendation ML model;
receiving a local output from the local command recommendation ML model; and
making a selection between the output and the local output based on at least one of response time, reliability and accuracy for display.

Item 7. The data processing system of any preceding item, wherein the instructions further cause the processor to cause the data processing system to perform functions of:
categorizing the one or more application command recommendations based on a confidence score.

Item 8. A method for providing one or more application command recommendations, comprising:
receiving a search query, the search query being an in-application assistance query;
accessing contextual data associated with the search query;
providing at least one of the search query and the contextual data as input to a multilingual machine-learning (ML) model to identify one or more application command recommendations;
obtaining the one or more application command recommendations as an output from the multilingual ML model; and
providing data about the output to the application for display,
wherein the multilingual ML model uses a multilingual encoder to provide command recommendations for a plurality of languages.

Item 9. The method of item 8, wherein the multilingual encoder maps the plurality of languages into one embedding space.

Item 10. The method of items 8 or 9, wherein:
the ML model includes a command prediction module,
the multilingual encoder convers the search query into an embedding,
the embedding is provided to the command prediction module as an input, and
the output is provided by the command prediction module.

Item 11. The method of item 10, wherein the command prediction module is a multi-layer neural network.

Item 12. The method of any of items 8-11, wherein the multilingual ML model is deployed via a host service.

Item 13. The method of any of items 8-12, further comprising:
upon receiving the search query, providing at least one of the search query and the contextual data to a local command recommendation ML model;
receiving a local output from the local command recommendation ML model; and
making a selection between the output and the local output based on at least one of response time, reliability and accuracy for display.

Item 14. The method of any of items 8-13, further comprising categorizing the one or more application command recommendations based on a confidence score.

Item 15. A non-transitory computer readable medium on which are stored instructions that, when executed, cause a programmable device to:
receive a search query, the search query being an in-application assistance query;
access contextual data associated with the search query;
provide at least one of the search query and the contextual data as input to a multilingual machine-learning (ML) model to identify one or more application command recommendations;
obtain the one or more application command recommendations as an output from the multilingual ML model; and
provide data about the output to the application for display,
wherein the multilingual ML model uses a multilingual encoder to provide command recommendations for a plurality of languages.

Item 16. The non-transitory computer readable medium of item 15, wherein the multilingual encoder maps the plurality of languages into one embedding space.

Item 17. The non-transitory computer readable medium of items 15 Or 16, wherein:
the ML model includes a command prediction module,
the multilingual encoder convers the search query into an embedding,
the embedding is provided to the command prediction module as an input, and
the output is provided by the command prediction module.

Item 18. The non-transitory computer readable medium of item 17, wherein the command prediction module is a multi-layer neural network.

Item 19. The non-transitory computer readable medium of any of items 15-18, wherein the multilingual ML model is deployed via a host service.

Item 20. The non-transitory computer readable medium of any of items 15-19, wherein the instructions further cause the programmable device to:
upon receiving the search query, provide at least one of the search query and the contextual data to a local command recommendation ML model;
receive a local output from the local command recommendation ML model; and
make a selection between the output and the local output based on at least one of response time, reliability and accuracy for display.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by, the processor, cause the data processing system to perform functions of:

receiving a search query in a first language, the search query being an in-application assistance query received via a user interface of an application;
accessing contextual data associated with the search query;
providing at least one of the search query and the contextual data as input to a multilingual machine-learning (ML) model to identify one or more application command recommendations in a second language, the second language being a preferred language of the application and the multilingual ML model being a unified ML model that provides in-application command recommendations in different languages;
obtaining the one or more application command recommendations as an output from the multilingual ML model;
upon receiving the search query, providing at least one of the search query and the contextual data to a local command recommendation ML model;
receiving a local output from the local command recommendation ML model;
making a selection between the output and the local output based on at least one of response time, reliability and accuracy for display; and
providing data about the output or the local output to the application for display,
wherein the multilingual ML model comprises
a multilingual encoder to convert search queries in a plurality of different languages into embeddings in one same embedding space, and
a command prediction module to receive an embedding of the search query as an input and to output a corresponding command recommendation so as to provide command recommendations for the plurality of languages, wherein the one or more application command recommendations are output in the preferred language of the application regardless of the first language of the search query.

2. The data processing system of claim 1, wherein the command prediction module is a multi-layer neural network.

3. The data processing system of claim 1, wherein the multilingual ML model is deployed via a hosting service.

4. The data processing system of claim 1, wherein the instructions further cause the processor to cause the data processing system to perform functions of:
categorizing the one or more application command recommendations based on a confidence score.

5. The data processing system of claim 1, wherein the multilingual ML model is trained by training a pretrained multilingual model using a labeled training data set that includes a plurality of languages.

6. A method for providing one or more application command recommendations, comprising:
receiving a search query in a first language, the search query being an in-application assistance query received via a user interface of an application;
accessing contextual data associated with the search query;
providing at least one of the search query and the contextual data as input to a multilingual machine-learning (ML) model to identify one or more application command recommendations in a second language, the second language being a preferred language of the application and the multilingual ML model being a unified ML model that provides in-application command recommendations in different languages;
obtaining the one or more application command recommendations as an output from the multilingual ML model;
upon receiving the search query, providing at least one of the search query and the contextual data to a local command recommendation ML model;
receiving a local output from the local command recommendation ML model;
making a selection between the output and the local output based on at least one of response time, reliability and accuracy for display; and
providing data about the output or the local output to the application for display,
wherein the multilingual ML model comprises
a multilingual encoder to convert search queries in a plurality of different languages into embeddings in one same embedding space, and
a command prediction module to receive an embedding of the search query as an input and to output a corresponding command recommendation so as to provide command recommendations for the plurality of languages, wherein the one or more application command recommendations are output in the preferred language of the application regardless of the first language of the search query.

7. The method of claim 6, wherein the command prediction module is a multi-layer neural network.

8. The method of claim 6, wherein the multilingual ML model is deployed via a host service.

9. The method of claim 6, further comprising categorizing the one or more application command recommendations based on a confidence score.

10. A non-transitory computer readable medium on which are stored instructions that, when executed, cause a programmable device to:
receive a search query in a first language, the search query being an in-application assistance query received via a user interface of an application;
access contextual data associated with the search query;
provide at least one of the search query and the contextual data as input to a multilingual machine-learning (ML) model to identify one or more application command recommendations in a second language, the second language being a preferred language of the application and the multilingual ML model being a unified ML model that provides in-application command recommendations in different languages;
obtain the one or more application command recommendations as an output from the multilingual ML model;
upon receiving the search query, provide at least one of the search query and the contextual data to a local command recommendation ML model;
receive a local output from the local command recommendation ML model; and
make a selection between the output and the local output based on at least one of response time, reliability and accuracy for display; and
provide data about the output or the local output to the application for display,
wherein the multilingual ML model comprises
a multilingual encoder to convert search queries in a plurality of different languages into embeddings in one same embedding space, and
a command prediction module to receive an embedding of the search query as an input and to output a corresponding command recommendation so as to provide command recommendations for the plurality of languages, wherein the one or more application command recommendations are output in the preferred language of the application regardless of the first language of the search query.

11. The non-transitory computer readable medium of claim 10 wherein the command prediction module is a multi-layer neural network.

12. The non-transitory computer readable medium of claim 10, wherein the multilingual ML model is deployed via a host service.

* * * * *